(12) United States Patent
Mathis et al.

(10) Patent No.: US 8,206,500 B1
(45) Date of Patent: Jun. 26, 2012

(54) PERFORMANCE GRADE ASPHALT MIX

(75) Inventors: Mark R. Mathis, Bardstown, KY (US); Bobby G. Upchurch, Harrodsburg, KY (US); Albert B. Kinman, Frankfrot, KY (US)

(73) Assignee: Shelbyville Asphalt Company, LLC, Bardstown, KY (US)

( * ) Notice: Subject to any disclaimer, the term of this patent is extended or adjusted under 35 U.S.C. 154(b) by 2 days.

(21) Appl. No.: 12/893,593

(22) Filed: Sep. 29, 2010

Related U.S. Application Data

(60) Provisional application No. 61/247,037, filed on Sep. 30, 2009, provisional application No. 61/366,713, filed on Jul. 22, 2010.

(51) Int. Cl.
*C09D 195/00* (2006.01)
*C10C 3/00* (2006.01)

(52) U.S. Cl. ............... 106/278; 106/273.1; 106/279; 106/281.1

(58) Field of Classification Search ............... 106/273.1, 106/278, 279, 281.1
See application file for complete search history.

(56) References Cited

U.S. PATENT DOCUMENTS

| | | | |
|---|---|---|---|
| 4,833,185 A | 5/1989 | Fachini | |
| 5,447,628 A | 9/1995 | Harrison et al. | |
| 5,573,656 A | 11/1996 | Santos | |
| 5,711,796 A | 1/1998 | Grzybowski et al. | |
| 5,755,865 A * | 5/1998 | Lukens | 106/279 |
| 5,814,207 A | 9/1998 | Kenton | |
| 5,904,760 A | 5/1999 | Hayner | |
| 5,911,817 A | 6/1999 | Hayner | |
| 6,027,557 A | 2/2000 | Hayner | |
| 6,048,447 A | 4/2000 | Hayner et al. | |
| 6,068,759 A | 5/2000 | Moore et al. | |
| 6,074,469 A | 6/2000 | Collins et al. | |
| 6,203,606 B1 | 3/2001 | Bond et al. | |
| 6,270,657 B1 | 8/2001 | Moore et al. | |
| 6,447,672 B1 | 9/2002 | Moore et al. | |
| 6,830,408 B1 | 12/2004 | Blankenship et al. | |
| 7,550,175 B1 | 6/2009 | Blankenship et al. | |
| 2008/0069638 A1* | 3/2008 | Crews et al. | 404/17 |
| 2009/0068348 A1 | 3/2009 | Reinke et al. | |
| 2009/0215931 A1 | 8/2009 | Reinke et al. | |

OTHER PUBLICATIONS

Derwent Acc-No. 2010:D19112, abstract of Korean Patent Specification No. KR 946588 B1 (Mar. 2010).*

* cited by examiner

*Primary Examiner* — Anthony J Green

(57) ABSTRACT

A Performance Grade asphalt mix composition is provided which contains i) an asphalt extender containing the residue from the purification process of used/waste lubricating oil; ii) liquid asphalt cement; iii) asphalt bearing waste materials; and iv) aggregates. The invention further relates to a method of preparing the asphalt composition and a paving composition containing same.

15 Claims, No Drawings

PERFORMANCE GRADE ASPHALT MIX

This application claims priority to U.S. provisional patent application 61/247,037, filed Sep. 30, 2009; and to U.S. provisional patent application 61/366,713, filed Jul. 22, 2010.

FIELD OF THE INVENTION

The invention relates to performance grade (PG) asphalt mix compositions which utilizes an asphalt extender obtained as residue in the refining of waste lubricating oil, and to a method for producing the same.

BACKGROUND

Asphalt based materials are used extensively in a wide variety of applications. For example, asphaltic material is widely employed as a primary ingredient in coating compositions for structures, in sealants, and in waterproofing agents. Asphalt compositions have been used in paving mixtures with considerable advantage for many years. Many manufactured roofing materials, such as roofing shingles, impregnated felts, tars, mastics, and cements are also based on asphalt and compositions thereof.

SUMMARY OF THE INVENTION

The technology solves a problem with conventional performance grade asphalt mix and the method for producing performance grade asphalt mix.

This technology also provides a performance grade asphalt mix which meets industry standards and utilizes asphalt bearing waste material in excess of those allowed in conventional performance grade asphalt mix. The asphalt extender will allow for larger amount of asphalt bearing waste material to be used in a performance grade asphalt mix. This additional asphalt bearing material would reduce the cost of the performance grade asphalt mix and impart desired physical properties usually not found in a conventional performance grade asphalt mix.

The method includes adding a liquid asphalt cement (bitumen obtained as residue in the refining of crude oil), aggregate (i.e. stone, sand, gravel, etc.), asphalt bearing waste materials (i.e. asphalt shingles, recycled asphalt pavement products (RAP), etc.) and an asphalt extender (bitumen obtained as residue in the refining of waste lubricating oil) in sufficient quantities to achieve the selected operating temperature range.

In particular, the method includes blending an asphalt extender with the liquid asphalt cement prior to combining with an asphalt bearing waste material and aggregates. The asphalt extender is added in an amount sufficient to eliminate the adverse effects of the asphalt bearing waste material while enhancing the beneficial effects of the asphalt bearing waste material. The asphalt extender is present in an amount of about 1% to about 75% by weight, or in an amount from about 5% to about 50% by weight, or in an amount from about 10% to about 40% by weight, of the total liquid asphalt needed for the performance grade asphalt mix. The amount of liquid asphalt is from about 3% to about 6% of the total weight of the performance graded asphalt mix. The amount asphalt bearing waste material is from about 2% to about 45% of the total weight of the performance graded asphalt mix; or from about 8% to about 35% of the total weight of the performance graded asphalt mix; or from about 10% to about 25% of the total weight of the performance graded asphalt mix. The amount of aggregate comprises from about 50% to about 95% of the total weight of the performance grade asphalt mix. The mixing temperature where the liquid is blended with the aggregate and the asphalt extender is generally from about 100° F. to about 500° F., or from about 200° F. to about 360° F.

DETAILED DESCRIPTION OF THE PREFERRED EMBODIMENTS

The Performance Grade (PG) asphalt composition (aka "asphalt composition" for the purposes of this disclosure) of the present invention is effective across a wide range of temperatures. An ideal PG modifier would be one which lowers the low end of this temperature range while raising the upper end of the temperature range. It has been found that the addition of a high viscosity base oil or finished lubricant to the asphalt will decrease the lower and upper ends of the temperature range by about a one to one (1:1) ratio. These modifiers, although not ideal, eliminate or significantly reduce the need to add polymers to the asphalt composition. This is due primarily to the fact that lubricants already contain polymeric compounds. However, these high viscosity base oils and finished lubricants are typically hydrotreated during their manufacture in order to purify them for use as lubricants. As a result, the hydrotreating process is extremely costly and requires a great deal of specialized equipment. What is needed are more cost-effective ways to modify the asphalt with alternative PG modifiers which would be able to lower the low end of the temperature range while raising the upper end of the temperature range.

One way to more economically accomplish this and to reduce the lower temperature limit at which the asphalt is effective, is by adding asphalt cement, and/or aggregate mixtures to the composition. As used herein, the term "asphalt cement" refers to any of a variety of solid or semi-solid materials at room temperature which gradually liquefy when heated and in which the predominant constituents are bitumens which are obtained as residue in petroleum refining. As used herein, the term "aggregate" refers to the additional materials such as sand, crushed stone, gravel, etc. which are added to the asphalt cement to produce the asphalt composition.

Asphalt Cement

The asphalt composition of the present invention may optionally include an asphalt cement component of reduced viscosity relative to the SDA (solvent deasphalted) bottoms component. Such an asphalt cement component can have a viscosity of about 100 to about 5000 poises at 60° C. (140° F.), or from about 250 to about 4000 poises, e.g., about 500 poises for AC5 asphalt cement. The asphalt cement component is added in amounts sufficient to provide the resulting asphalt composition with the desired viscosity for the intended application, e.g., about 2000 poises at 60° C. (140° F.) for paving applications. For Performance Graded Applications, the asphalt compositions will have a G*/sin delta value in excess of 1.0 kPa at temperatures ranging from about 46 to about 82° C., or from about 52 to about 76° C. Generally, the asphalt compositions of the present technology may contain from about 0 to about 95 wt %, or from about 0 to about 80 wt %, e.g., about 5 to about 95 wt %, of such asphalt cement component. The asphalt cement component of reduced viscosity can be obtained from any suitable source, e.g., atmospheric distillation bottoms.

Asphalt Extender

The asphalt extender used in this composition is obtained as the residue in the refining (distillation) of waste (used) lubricating oil. The waste lubricating oil can originate from any number of different sources. These sources include, but are not limited to, automotive lubricating oils that are usually formulated from paraffin based petroleum distillate oils or from synthetic base lubricating oils. Also included are waste lubricating oils which are combined with additives such as soaps, extreme pressure (E.P.) agents, viscosity index (V.I.) improvers, antifoamants, rust inhibitors, antiwear agents, antioxidants, and polymeric dispersants to produce an engine lubricating oil of about SAE 5 to about SAE 60 viscosity. This waste oil may also contain organo-metallic additives such as zinc dialkylthiophosphate from the original lubricating oil formulation, sludge formed in the engine, and water. The waste lubricating oil may also contain contaminants such as waste grease, brake fluid, transmission oil, transformer oil, railroad lubricant, crude oil, antifreeze, dry cleaning fluid, degreasing solvents such as trichloroethylene, edible fats and oils, mineral acids, soot, earth and waste of unknown origin.

Also included within the group of used waste lubricating oils suitable for treatment are waste lubricating oils having mineral lubricating oils such as liquid petroleum oils and solvent-treated or acid-treated mineral lubricating oils of the paraffinic, naphthenic or mixed paraffinic-naphthenic types as the base oil.

Oils of lubricating viscosity derived from coal or shale oil are also included as the base oil of such used lubricating oils. This group also includes used lubricating oils having as the base oil, synthetic lubricating oils including hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di(2-ethylhexyl)benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils that can be the base oil of the used lubricating oils treated in the present invention. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diethyl ether of polyethylene glycol having a molecular weight of 500-1000, diethyl ether of polypropylene glycol having an average molecular weight of 1000-1500, etc.) or mono- and polycarboxylic esters thereof, for example, the acetic acid esters, mixed $C_3$-$C_8$ fatty acid esters, or the $C_{13}$ Oxo acid diester of tetraethylene glycol.

Another suitable class of synthetic lubricating oils that can serve as the base oil of the used lubricating oils treated by the present invention, comprises esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyladipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Esters useful as synthetic oils that the used lubricating oils to be treated can be derived from include $C_5$-$C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another class of synthetic oils that can be the base oil of the used lubricating oils that can be treated (e.g., tetraethyl silicate, tetraisopropyl silicate, tetra-(2-ethylhexyl) silicate, tetra-(4-methyl-2-ethylhexyl) silicate, tetra-(p-tert-butylphenyl)silicate, hexa-(4-methyl-2-pentoxy)-disiloxane, poly(methyl)siloxanes, poly(methylphenyl)siloxanes, etc.). Other synthetic oils include liquid esters of phosphorus-containing acids (e.g., tricresyl phosphate, trioctyl phosphate, diethyl ester of decylphosphonic acid, etc.), polymeric tetrahydrofurans and the like.

The foregoing used lubricating oils usually contain one or more of various additives such as, for example, oxidation inhibitors (i.e., barium, calcium and zinc alkyl thiophosphates, di-t-butyl-p-cresol, etc.), anti-wear agents (i.e., organic lead compounds such as lead diorganophosphorodithioates, zinc dialkyldithiophosphates, etc.), dispersants, (i.e., calcium and barium sulfonates and phenoxides, etc.), rust inhibitors (i.e., calcium and sodium sulfonates, etc.), viscosity index improvers, (i.e., polyisobutylenes, polyalkylstyrene, etc.), and detergents (i.e., calcium and barium salts of alkyl and benzene sulfonic acids and ashless type detergents such as alkyl-substituted succinimides, etc.). Additionally, the used lubricating oils treated in accordance with the present invention usually contain various contaminants resulting from incomplete fuel combustion as well as water and gasoline. The process of the present invention is particularly suitable for removing or reducing to acceptable levels (e.g., to permit subsequent hydrogenation without poisoning the hydrogenation catalyst) the above-indicated nitrogen-containing materials and metal-containing materials.

Reclaiming of waste lubricating oil is largely carried out by small processors using various processes tailored to the available waste oil, product demands, and local environmental considerations. Such processes at a minimum include distillation which provides an overhead rerefined lubricating oil product and rerefined lubricating oil residue, which can contain considerable amounts of metals. Moreover, the addition of waste lubricating oil residue to such products provides a way to vary softening points, or other properties affected by addition of diluent, e.g., viscosity, penetration, or rheological properties.

Asphalt Bearing Waste Material Component

Any suitable asphalt may be employed for producing the PG asphalt blend compositions of the invention. For example, industrial asphalts used for coatings, sealants, roofing materials, adhesives, and other applications may be used. Paving grade asphalt compositions, however, are employed in the preferred embodiment of the invention. Asphalt compositions may be derived, as indicated, from any well known bituminous or asphaltic substance obtained from natural sources or derived from a number of sources such as petroleum, shale oil, coal tar, and the like, as well as mixtures of two or more of such materials. Typical of such asphalts are the straight run asphalts derived from the atmospheric, steam and/or vacuum distillation of crude oils, or those asphalts derived from solvent precipitation treatments of raw lubricating oils and their fractions. Also included are the thermal or "cracked" asphalts which are separated as cracker bottom residues from refinery cracking operations and the asphalts produced as byproducts in hydrorefining operations.

As indicated, for paving applications, any suitable paving grade asphalt may be employed for the compositions of the invention. Such paving grade asphalt compositions are often referred to as viscosity, penetration graded, or performance graded (PG) asphalts having penetrations up to 400 as measured by ASTM method D5. The asphalt blend compositions of asphalt component and the used lubricating oil bottoms of the present invention also exhibit improved low temperature performance properties without excessive sacrifice of high temperature PG grade performance, e.g., rutting resistance.

Example 1

Combined in a 4 gallon, metal bowl are about 2,938 grams of coarse aggregate (dolomite screened as a K.Y.T.C. No. 9M) manufactured by Cedar Creek Quarries, LLC; about 1,958 grams of fine aggregate (dolomite screened as a K.Y.T.C. Class I Sand) manufactured by Cedar Creek Quarries, LLC; about 960 grams of recycled asphalt pavement (roadway millings) supplied by Mago Construction Company, LLC; about 256 grams of asphalt shingles (postconsumer residential shingles) supplied by Mago Construction Company, LLC; and about 288 grams of liquid asphalt derived from blending about 300 grams of asphalt extender manufactured by Heartland Refinery Group, LLC and about 2,700 grams of performance grade asphalt cement meeting the requirements of a PG 64-22 supplied by Shelbyville Asphalt Company, LLC.

Before combining, the aggregates are dried overnight in a 320° F. oven and kept at about 320° F. until added to the mixture. The liquid asphalt is blended by hand at about 300° F. and kept at about 300° F. until added to the mixture. All of the components are blended together to form a homogeneous performance grade asphalt mix. The liquid asphalt is then extracted from the mix and tested. The testing results show that the performance grade asphalt mix contains a liquid asphalt meeting the standard requirements of a PG 70-28. More specifically, the liquid asphalt limits are determined to meet a PG 74.9-31.6 specification.

What is claimed is:

1. A performance grade asphalt mix which comprises: i) an asphalt extender obtained as a residue in the refining of waste lubricating oil; ii) a liquid asphalt cement; iii) asphalt bearing waste materials; and iv) aggregates;
    wherein the asphalt extender is present in an amount of about 5% to about 50% by weight of the total liquid asphalt cement needed for the performance grade asphalt mix; the liquid asphalt cement is present in an amount of about 3% to about 6% of the total weight of the performance grade asphalt mix; the asphalt bearing waste materials are present in an amount of about 2% to about 45% of the total weight of the performance grade asphalt mix; and the aggregates are present in an amount of about 50% to about 95% of the total weight of the performance grade asphalt mix.

2. The performance grade asphalt of claim 1, wherein the liquid asphalt cement is present in an amount of about 3% to about 6% of the total weight of the performance grade asphalt mix.

3. The performance grade asphalt of claim 1, wherein the asphalt bearing waste materials are present in an amount of about 2% to about 45% of the total weight of the performance grade asphalt mix;

4. The performance grade asphalt of claim 1, wherein the aggregates are present in an amount of about 50% to about 95% of the total weight of the performance grade asphalt mix.

5. The performance grade asphalt of claim 1, wherein the liquid asphalt cement is present in an amount of about 3% to about 6% of the total weight of the performance grade asphalt mix; the asphalt bearing waste materials are present in an amount of about 2% to about 45% of the total weight of the performance grade asphalt mix; and the aggregates are present in an amount of about 50% to about 95% of the total weight of the performance grade asphalt mix.

6. The performance grade asphalt of claim 1, wherein the asphalt cement comprises bitumens which are obtained as residue in petroleum refining and are a solid or semi-solid materials at room temperature and which gradually liquefy when heated.

7. The performance grade asphalt of claim 6, wherein aggregates are selected from the group consisting of sand, crushed stone, and gravel, and combinations thereof.

8. The performance grade asphalt of claim 1, wherein the asphalt extender is present in an amount of about 10% to about 40% by weight of the total liquid asphalt cement needed for the performance grade asphalt mix; the liquid asphalt cement is present in an amount of about 3% to about 6% of the total weight of the performance grade asphalt mix; the asphalt bearing waste materials are present in an amount of about 2% to about 45% of the total weight of the performance grade asphalt mix; and the aggregates are present in an amount of about 50% to about 95% of the total weight of the performance grade asphalt mix.

9. The performance grade asphalt of claim 8, wherein the asphalt cement comprises bitumens which are obtained as residue in petroleum refining and are a solid or semi-solid materials at room temperature and which gradually liquefy when heated.

10. The performance grade asphalt of claim 9, wherein aggregates are selected from the group consisting of sand, crushed stone, and gravel, and combinations thereof.

11. A performance grade asphalt mix of claim 1, wherein the asphalt cement comprises bitumens which are obtained as residue in petroleum refining; and wherein the aggregates are selected from the group consisting of sand, crushed stone, and gravel, and combinations thereof.

12. A process for making performance grade asphalt comprising blending an asphalt extender with liquid asphalt cement prior to combining with asphalt bearing waste materials and aggregates, wherein the asphalt extender is obtained as a residue in the refining of waste lubricating oil;
    wherein the asphalt extender is present in an amount of about 5% to about 50% by weight of the total liquid asphalt cement needed for the performance grade asphalt mix; the liquid asphalt cement is present in an amount of about 3% to about 6% of the total weight of the performance grade asphalt mix; the asphalt bearing waste materials are present in an amount of about 2% to about 45% of the total weight of the performance grade asphalt mix; and the aggregates are present in an amount of about 50% to about 95% of the total weight of the performance grade asphalt mix.

13. The process of claim 12 wherein the mixing temperature is from about 200° F. to about 360° F.

14. The process of claim 12, wherein the asphalt cement comprises bitumens which are obtained as residue in petroleum refining and are a solid or semi-solid materials at room temperature and which gradually liquefy when heated.

15. The process of claim 1 wherein aggregates are selected from the group consisting of sand, crushed stone, and gravel, and combinations thereof.

* * * * *

UNITED STATES PATENT AND TRADEMARK OFFICE
CERTIFICATE OF CORRECTION

PATENT NO. : 8,206,500 B1
APPLICATION NO. : 12/893593
DATED : June 26, 2012
INVENTOR(S) : Mark R. Mathis, Bobby G. Upchurch and Albert B. Kinman It is certified that error appears in the above-identified patent and that said Letters Patent is hereby corrected as shown below:

Column 6, Line 55, Claim 15, the claim reference to claim 1, should read claim 14,.

Signed and Sealed this
Fourteenth Day of August, 2012

David J. Kappos
*Director of the United States Patent and Trademark Office*